United States Patent [19]
Flank et al.

[11] 3,775,136

[45] *Nov. 27, 1973

[54] CALCIUM SODIUM ALUMINO DISILICATE FOAM

[75] Inventors: William H. Flank, Broomall; James E. McEvoy, Springfield, both of Pa.; John R. Stuart, deceased, late of Brookhaven, Pa. by Clara M. Stuart, successor

[73] Assignee: Air Products and Chemicals, Inc., Philadelphia, Pa.

[ * ] Notice: The portion of the term of this patent subsequent to Apr. 13, 1988, has been disclaimed.

[22] Filed: Jan. 25, 1971

[21] Appl. No.: 109,638

Related U.S. Application Data

[63] Continuation of Ser. No. 693,733, Dec. 27, 1967, Pat. No. 3,574,647.

[52] U.S. Cl............... 106/40, 106/75, 252/62, 252/378
[51] Int. Cl............................................. C04b 33/00
[58] Field of Search ............... 106/40, 71, 72, 75, 106/65, 39 DV; 23/111, 112 R, 113; 252/455 R, 455 Z, 457; 264/43; 65/22

[56] References Cited
UNITED STATES PATENTS

| | | | |
|---|---|---|---|
| 3,009,776 | 11/1961 | Sensel | 23/112 R |
| 3,475,225 | 10/1969 | Tennenhouse | 106/65 |
| 3,574,647 | 4/1971 | Flank et al. | 106/40 |
| 2,992,068 | 7/1961 | Haden et al. | 23/112 |
| 3,597,155 | 8/1971 | Flanigen | 23/111 |
| 3,449,070 | 6/1969 | McDaniel et al. | 23/111 |
| 3,518,051 | 6/1970 | Maher et al. | 23/111 |
| 3,594,331 | 7/1971 | Elliott | 252/455 |
| 3,322,690 | 5/1967 | Bilisoly | 252/455 |

FOREIGN PATENTS OR APPLICATIONS

| | | | |
|---|---|---|---|
| 855,301 | 11/1960 | Great Britain | 252/458 R |

OTHER PUBLICATIONS

Evans, R. C.; Crystal Chemistry; Cambridge, 1964, p. 258, (QD 905E83).

Levin, E. M. et al.; Phase Diagrams For Ceramists: Columbes, 1969, pp. 172–174 (QD 501L4).

*Primary Examiner*—Helen M. McCarthy
*Attorney*—B. Max Klevit and John R. Ewbank

[57] ABSTRACT

A zeolite sodium aluminodisilicate, such as prepared by refluxing meta kaolin in 10% NaOH solution, is at least 50 percent ion exchanged to the calcium form, which is heated at 900°–1150°C. for several minutes to provide a non-zeolitic crystalline low density calcium sodium aluminodisilicate foam. Insulation panels can be made from such unique calcium sodium aluminodisilicate foam.

1 Claim, No Drawings

CALCIUM SODIUM ALUMINO DISILICATE FOAM

CROSS REFERENCE TO PARENT APPLICATION

This application is in part a continuation of Ser. No. 693,733 filed Dec. 27, 1967 maturing as U.S. Pat. No. 3,574,647 on Apr. 13, 1971, all the disclosure of which is deemed here reiterated. By terminal disclaimer, this case expires simultaneously with said parent.

BACKGROUND OF THE INVENTION

1. Field of Invention

This invention relates to pore-forming methods for modifying aluminodisilicate ceramics, and to the ceramic foam composition resulting therefrom.

2. Prior Art

Foam glass and many other varieties of inorganic foam are predominantly amorphous. Thermal recrystallization simultaneously with formation of ceramic foam is quite distinguishable from the better known routes toward expanded vermiculite, low density perlite, and related materials. Prior workers have recognized that the sodium aluminodisilicate described as an intermediate for the manufacture of ultramarine in Kumins et al.,"Industrial and Engineering Chemistry" 45, 567-572 (1953) and Kumins et al. U.S. Pat. No. 2,544,695 has some resemblence to the Zeolite A of Milton U.S. Pat. No. 2,882,243. Some of the disclosures linking the Kumins type of sodium aluminodisilicate with Zeolite A include Howell U.S. Pat. No. 3,114,603, Howell et al. U.S. Pat. No. 3,119,660, and Haden et al. U.S. Pat. No. 2,992,068.

SUMMARY OF THE INVENTION

A non-zeolitic crystalline calcium sodium aluminodisilicate having low density, low surface area, minimized moisture sorption propensities, and open pore structure is prepared by heating at 900°–1150°C. for 10–120 minutes a zeolite corresponding to $(CaO)_{0.5-0.9} \cdot (Na_2O)_{0.1-0.5} \cdot Al_2O_3 \cdot 2SiO_2 \cdot yH_2O$ in which y has a value such that the water content is about 0.2–3 percent by weight of the zeolite.

DESCRIPTION OF PREFERRED EMBODIMENTS

The nature of the invention is clarified by reference to Examples I–VIII of said parent application, previously deemed reiterated. Examples IX–XIII of the parent application concern interesting compositions outside some of the chemical limitations herein. The invention is further clarified by reference to the following examples.

EXAMPLES XIV-XV

Following the procedure of Example 1 of Kumins' U.S. Pat. No. 2,544,695, kaolin is calcined to 800°C. for 3 hours to prepare a catalytic grade of meta kaolin, which is dispersed in an aqueous solution containing 10 percent sodium hydroxide, and the mixture is agitated and maintained at about reflux temperature for about 16 hours. The solid sodium zeolitic product is filtered from the solution and corresponds generally to the Zeolite A material of U.S. Pat. Nos. 3,114,603 and 3,119,660. The sodium zeolite is treated with a series of solutions of $CaCl_2$ and then with water to prepare a calcium sodium zeolite in which at least 50 percent of the ion exchange capacity is occupied by calcium and in which at least 10 percent of the ion exchange capacity is occupied by sodium. The product is water washed to provide a calcium sodium zeolite corresponding to the formula $(CaO)_r \cdot (Na_2O)_s \cdot M^{+n}O_{n/2})_{1-r-s} \cdot Al_2O_3 \cdot 2SiO_2 \cdot yH_2O$ in which r is at least 0.5 and s is at least 0.1 and $1-r-s$ is 0, and in which n is the valence of the miscellaneous metal. The value of s is always greater than $1-r-s$. The values of r and s respectively are 0.7 and 0.3 after four steps of one hour of ion exchange with a 100 percent stoichiometric excess of hot solution of 1 molar $CaCl_2$.

Any of several miscellaneous metal ions can be introduced by ion exchange and if their total molar concentration is less than the sodium concentration, the suitability of the material for the present invention is not destroyed. Because of their non-interference with operability, such miscellaneous metals are generally not mentioned in naming the composition or designating the formula of what essentially constitutes the zeolite. Similarly, as long as the amount of the miscellaneous metal ion is less than the amount of residual sodium ion, some or all of such miscellaneous metal ions may be introduced during an alkaline aging step instead of by ion exchange, while still retaining calcium sodium aluminodisilicate as the terminology for the ion exchanged zeolite.

One sample of sodium Zeolite A for Example XIV was prepared by aging the hot alkaline dispersion of meta kaolin. Another sample of sodium Zeolite A for Example XV was purchased from a manufacturer. The sodium Zeolite A samples of Examples XIV and XV are subjected to four steps of one hour of ion exchange with a 100 percent stoichiometric excess of hot solution of 1 molar $CaCl_2$. The resulting calcium sodium alumino-disilicate is placed in quartz trays of about 30 × 23 × 8 cm and heated to about 1,000°C. for about 60 minutes. The foamed slab is cooled and sawed into insulating panels about 2.5 cm thick. The insulating panels of Example XIV were prepared by the identical procedure of Example XV, the only difference being that Kumins type zeolite was the starting material in Example XIV and commercially available Zeolite A was the starting material in Example XV.

The panels are evaluated and shown to have properties including:

Panel Table

| | Example XIV | Example XV |
| --- | --- | --- |
| density | 240g/l | 240g/l |
| shrinkage | 0.6% after 24 hrs. at 2300°F. | 0.6% after 24 hrs. at 2300°F. |
| thermal conductivity | 0.71 BTU/hr./ft²/in. | 0.71 BTU/hr./ft²/in. |
| moisture absorption | 0.03 wt. % after 24 hrs. at 95% relative humidity at about 70°F. | 0.03 wt. % after 24 hrs. at 95% relative humidity at about 70°F. |
| compressive strength | 1,751g/cm² | 1,751g/cm² |
| specific pore volume | 2.5 cc/g | 2.5 cc/g |
| specific heat | 0.22 cal/g/°C | 0.22 cal/g/°C |

The identical properties of the panels of Example XIV and XV indicate that the ceramic foam is the same whichever of the two types of $Na_2 \cdot Al_2O_3 \cdot 2SiO_2$ is employed as starting material. The properties of said insulating panels are distinguishable from any of the widely marketed insulating materials, whereby a unique insulating panel is produced.

Some previously marketed insulating panels have a propensity to absorb significant amounts of moisture, and the freedom therefrom helps to provide an important advantage for the foamed calcium sodium aluminodisilicate.

X-ray diffraction data concerning the foamed calcium sodium aluminodisilicate provided the basis for establishing an identification of the foamed calcium sodium aluminodisilicate, as set forth in appended Table A. The X-ray diffraction data confirmed the identity of the crystalline calcium sodium alumino-disilicate notwithstanding minor variations such as selection of commercially available Zeolite A or Kumins type of sodium alumino-disilicate as starting material, variations in the completion of the calcium exchange, presence or absence of minor amounts of modifier such as lithium, barium, or potassium, and size or shape of the structures such as panels made by the foaming.

The foamed calcium sodium aluminodisilicate was pulverized and the powder subjected to standard X-ray diffraction procedures to provide the following data:

TABLE A

| d,A | $I/I_o$ |
|---|---|
| 8.63 | 12 |
| 4.98 | 19 |
| 4.31 | 16 |
| 4.19 | 33 |
| 4.04 | 23 |
| 3.85 | 51 |
| 3.76 | 16 |
| 3.63 | 14 |
| 3.36 | 14 |
| 3.26 | 65 |
| 3.19 | 100 |
| 3.13 | 16 |
| 3.04 | 19 |
| 3.00 | 70 |
| 2.88 | 30 |
| 2.57 | 19 |
| 2.51 | 14 |
| 2.30 | 26 |
| 2.14 | 14 |
| 2.09 | 21 |
| 2.08 | 19 |

Such X-ray data suggest either a mixture possibly comprising nepheline, plagioclase and anorthite, or possibly a unique single crystalline species having no name other than foamed calcium sodium aluminodisilicate.

Foams in accordance with this invention have a volume shrinkage of less than about 0.7 percent when maintained at 1250°C for 24 hours; a moisture absorption of less than 0.1 percent when maintained at 95 percent relative humidity for 24 hours at ambient temperature; and a compressive strength of at least 1.5 kilograms per square centimeter.

Various modifications of the invention are possible without avoiding the scope of the claims.

We claim:

1. A low-density ceramic foam consisting essentially of calcium sodium aluminodisilicate, derived by thermal recrystallization, at conditions including a temperature in the range of 900°–1150°C for 10 to 120 minutes, of synthetic zeolite corresponding to $(CaO)_{0.5-0.9} \cdot (Na_2O)_{0.1-0.5} \cdot Al_2O_3 \cdot 2SiO_2 \cdot yH_2O$ in which $y$ has a value such that the water content is 0.2–3 percent by weight of the zeolite, said ceramic foam characterized in having a. a plurality of uniformly distributed interconnected open pores contributing a porosity of at least 75 volume percent, said open pores having diameters from about 5 to about 30 microns contributing about 75 percent of the porosity;

b. a crystalline composition substantially free of x-ray detectable zeolitic crystallinity;

c. a bulk density of less than 0.3 kilograms per liter;

d. a surface area of less than about 5 square meters per gram;

e. a moisture absorption of less than 0.1 percent when maintained at 95 percent relative humidity per 24 hours at ambient temperature;

f. a compressive strength of at least 1.5 kilograms per square centimeter;

g. a volume shrinkage of less than about 0.7 percent when maintained at 1250°C. for 24 hours; and h. an initial fusion temperature of at least 1250°C.

* * * * *